July 22, 1924.
M. D. STALDER
TROLLEY
Filed Sept. 14, 1923
2 Sheets-Sheet 1
1,502,596
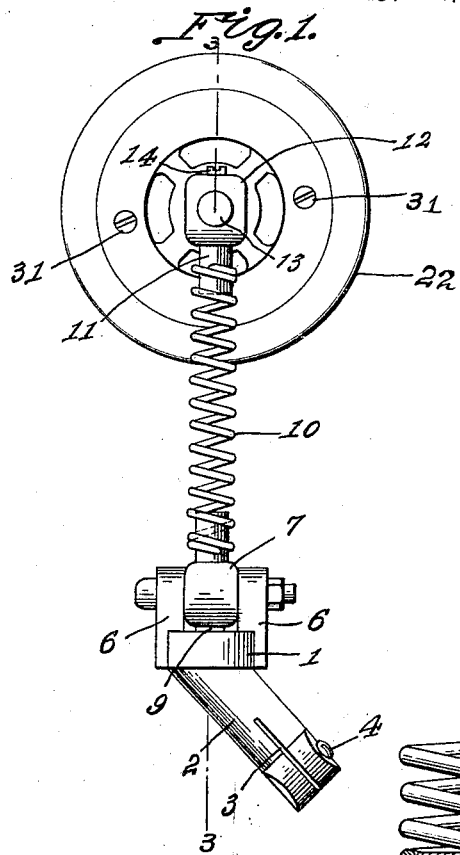
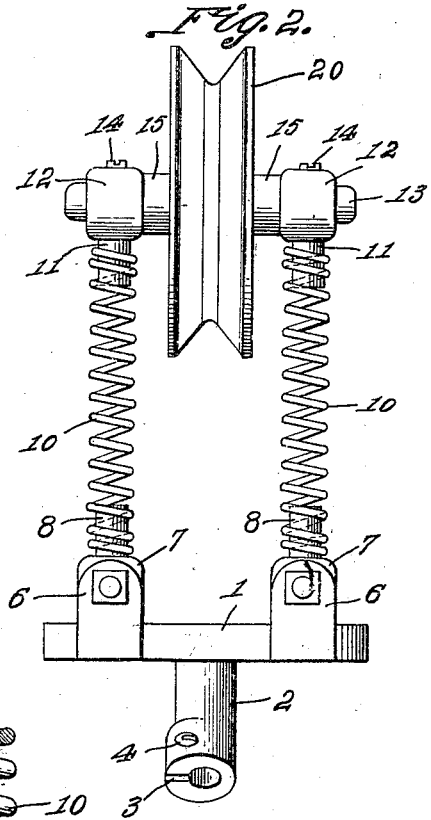
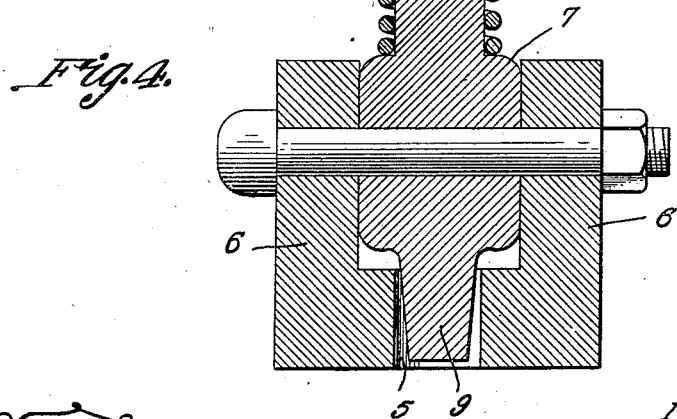
Merle D. Stalder
INVENTOR
BY Victor J. Evans
ATTORNEY July 22, 1924.
M. D. STALDER
1,502,596
TROLLEY
Filed Sept. 14, 1923      2 Sheets-Sheet 2
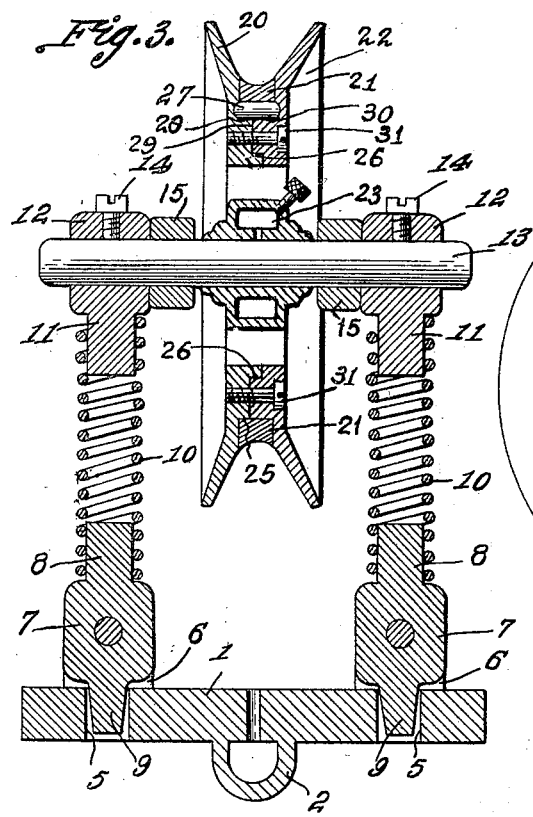
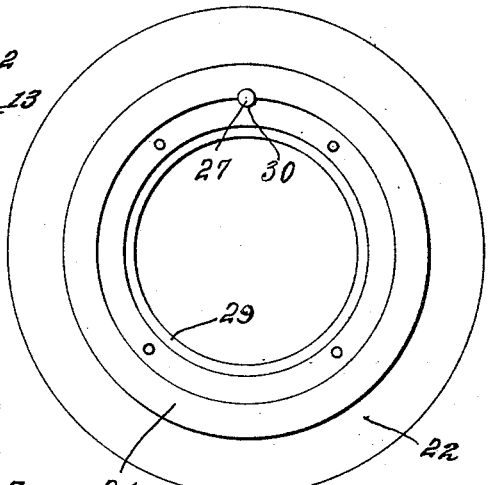
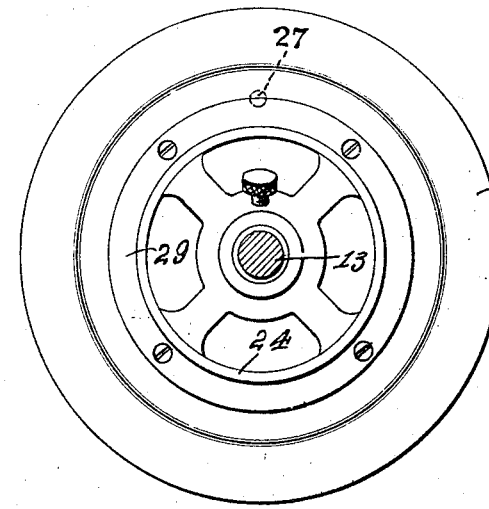
Merle D. Stalder
INVENTOR
BY Victor J. Evans
ATTORNEY
WITNESS Patented July 22, 1924.

1,502,596

UNITED STATES PATENT OFFICE.

MERLE D. STALDER, OF LINCOLN, NEBRASKA.

TROLLEY.

Application filed September 14, 1923. Serial No. 662,725.

*To all whom it may concern:*

Be it known that I, MERLE D. STALDER, a citizen of the United States, residing at Lincoln, in the county of Lancaster and State of Nebraska, have invented new and useful Improvements in Trolleys, of which the following is a specification.

One object of my said invention is the provision of a trolley designed for use on the trolley pole of a trolley car and constructed in such manner as to avoid wear incident to use.

Another object of the invention is the provision of a trolley of such construction that by easy adjustment the wheel for engaging the overhead wire may be maintained in the center of the trolley as is desirable.

Another object is the provision in a trolley of a sectional wheel, the center member of which may be expeditiously and easily removed when worn and as readily replaced with a fresh central member without impairing the usefulness of the other members of the wheel.

Another object is the provision of a trolley equipped with improved means for effecting connection between the same, and a trolley pole.

To the attainment of the foregoing, the invention consists in the improvement as hereinafter described and definitely claimed.

In the accompanying drawings, forming part of this specification:—

Figure 1 is a side elevation of my novel trolley.

Figure 2 is a front elevation of the trolley.

Figure 3 is a vertical transverse section taken through the trolley in the plane indicated by the line 3—3 of Figure 1.

Figure 4 is an enlarged detail section showing the mounting of one of the rocking members in its standards.

Figure 5 is a side elevation of the auxiliary member of the trolley wheel.

Figure 6 is a side elevation of the trolley wheel complete.

Similar numerals of reference designate corresponding parts in all of the views of the drawings.

Among other elements my novel trolley comprises a base frame 1 to which is fixed a sleeve 2, split in its lower end portion as designated by 3 and equipped with a screw 4 whereby the sleeve may be clamped on a trolley pole and so as to maintain the base frame 1 in such position relative to the trolley pole that the trolley will rest in upright position as is desirable. The said base frame 1 is provided with vertical apertures 5 and is also provided adjacent to each of its ends with a pair of standards 6. Mounted to swing between the said pairs of standards 6 are rocking members 7 on which are upstanding studs 8 and pendent studs 9, the said pendent studs being preferably tapered as shown and disposed in the before mentioned vertical apertures 5 with a view to limiting the rocking movement of the member 7 in the direction of the width of the trolley.

Surrounding and maintained in position by the upstanding studs 8 are coiled springs 10, and seated in the upper portions of the said coiled springs 10 are pendent studs 11 on boxes 12. The said boxes 12 receive an arbor 13, and the said arbor 13 is adjustably fixed in the boxes 12 through the medium of set screws 14. Manifestly when the set screws 14 are loosened, the arbor 13 may be adjusted endwise in the boxes 12 for the maintenance of the wheel hereinafter described in detail in the center of the trolley as is desirable. Spacing collars 15 are mounted on the arbor 13 and interposed between the wheel and the inner sides of the boxes 12 with a view to averting undue lateral play of the wheel in the trolley.

By virtue of the springs 10 being carried by the rocking members 7, and serving, in turn, to carry the boxes in which the arbor 13 is mounted it will be readily understood that the said springs 10 are calculated to avert undue wear of the wire engaged by the wheel as well as undue wear of the wheel, the springs having considerable play of swing at either side of the wheel.

The wheel of my novel trolley is made up of a body member 20, a removable annulus or annular member 21 and an auxiliary member 22. The body member 20 comprises a hollow central portion 23 adapted to hold graphite or other lubricant and appropriately equipped for the appropriate introduction of lubricant, and an annular portion 24 fixed to said central portion 23 and surrounding a part thereof and having inner shoulders 25 and 26 as shown. The removable annulus 21 is circumferentially grooved to engage a trolley wire and is preferably provided with a key 27 to seat in a notch 28 in the shoulder 25 of the annular portion 24 on the body member 20. The auxiliary side member 22 of the wheel is provided with an interior annular flange 29 which is designed to surround the portion 24 of the member 20 and to rest within and solidly support the annulus 21 and is provided at 30 in the said flange 29 with a seat to receive the before mentioned key 27. Manifestly when the parts of the novel wheel are assembled in proper relation the key 27 will preclude turning of any one of the members of the wheel relative to the other members thereof. It will also be manifest that when the members 20 and 22 are connected together by screws 31 or other appropriate means the three described members will constitute a strong and durable trolley wheel, and one which may be supplied when occasion demands with a fresh annular member 21 thereby averting loss of the wheel as a whole.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A trolley comprising a base frame, members mounted on said base frame to rock in the direction of the width of the trolley and having upstanding studs, coiled springs surrounding and supported by and extending upwardly by the said studs, members having pendent studs disposed in the upper convolutions of the springs, and a trolley wheel mounted between the last-named members.

2. A trolley comprising a base frame, members mounted on said base frame to rock in the direction of the width of the trolley and having upstanding studs, coiled springs surrounding and supported by and extending upwardly by the said studs, members having pendent studs disposed in the upper convolutions of the springs, and a trolley wheel mounted between the last-named members; the last-named members being in the form of boxes and being combined with an arbor adjustable endwise in the boxes and on which the wheel is mounted, and means carried by the boxes for adjustably fixing the arbor thereto.

3. A trolley comprising a base frame, members mounted thereon to swing in the direction of the width of the trolley, coiled springs supported on said members and adapted to swing with the members in the direction of the width of the trolley and independently of the members in the direction of the length of the trolley, and a trolley wheel disposed between the springs and carried by means on the upper portions of the springs.

In testimony whereof I affix my signature.

MERLE D. STALDER.